(12) United States Patent
Stoner et al.

(10) Patent No.: US 10,508,824 B2
(45) Date of Patent: Dec. 17, 2019

(54) DEVICES AND METHODS FOR INTERACTING WITH A CONTROL SYSTEM THAT IS CONNECTED TO A NETWORK

(71) Applicant: Ademco Inc., Golden Valley, MN (US)

(72) Inventors: Marcus D. Stoner, Minnetonka, MN (US); Soumitri Kolavennu, Blaine, MN (US); Brad Paine, Minnetonka, MN (US); Christopher Goh, Chanhassen, MN (US)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/175,641

(22) Filed: Oct. 30, 2018

(65) Prior Publication Data

US 2019/0072290 A1     Mar. 7, 2019

Related U.S. Application Data

(63) Continuation of application No. 13/911,638, filed on Jun. 6, 2013, now Pat. No. 10,145,579, which is a
(Continued)

(51) Int. Cl.
*F24F 11/30*     (2018.01)
*G05B 15/02*     (2006.01)
(Continued)

(52) U.S. Cl.
CPC .............. *F24F 11/30* (2018.01); *G05B 15/02* (2013.01); *H04L 12/2816* (2013.01);
(Continued)

(58) Field of Classification Search
None
See application file for complete search history.

(56) References Cited

U.S. PATENT DOCUMENTS

| 4,223,831 A | 9/1980 | Szarka |
| 4,253,153 A | 2/1981 | Bitterli et al. |
| (Continued) | | |

FOREIGN PATENT DOCUMENTS

| CN | 201225714 Y | 4/2009 |
| CN | 101947788 A | 1/2011 |
| (Continued) | | |

OTHER PUBLICATIONS

English language translation of bibliographic data and abstract of CN201225714 (Y).
(Continued)

*Primary Examiner* — Sean Shechtman
(74) *Attorney, Agent, or Firm* — Husch Blackwell LLP

(57) ABSTRACT

A building automation system may be controlled in response to a natural language voice message. The natural language voice message may be recorded and then sent to a voice command manager via a network. The natural language voice message is then translated into a command recognizable by a building automation controller of the building automation system. Voice recognition software may be used to create a natural language text based message from the recorded natural voice message, and the natural language text based message may then be translated into the command recognizable by the building automation controller. In response to the command, the building automation controller may perform the desired action.

18 Claims, 9 Drawing Sheets

Related U.S. Application Data continuation-in-part of application No. 13/875,213, filed on May 1, 2013, now Pat. No. 10,088,853.

(51) Int. Cl.
*H04L 12/28* (2006.01)
*H04L 12/58* (2006.01)
*F24F 110/00* (2018.01)
*F24F 130/40* (2018.01)
*F24F 120/20* (2018.01)
*F24F 11/58* (2018.01)

(52) U.S. Cl.
CPC ........... *F24F 11/58* (2018.01); *F24F 2110/00* (2018.01); *F24F 2120/20* (2018.01); *F24F 2130/40* (2018.01); *H04L 51/36* (2013.01)

(56) References Cited

U.S. PATENT DOCUMENTS

| | | | |
|---|---|---|---|
| 4,340,797 A | 7/1982 | Takano et al. | |
| 4,353,502 A | 10/1982 | Myers | |
| 4,381,549 A | 4/1983 | Stamp, Jr. et al. | |
| 4,598,397 A | 7/1986 | Nelson et al. | |
| 4,790,143 A | 12/1988 | Hanson | |
| 5,065,813 A | 11/1991 | Berkeley et al. | |
| 5,086,385 A | 2/1992 | Launey et al. | |
| 5,123,252 A | 6/1992 | Hanson | |
| 5,161,606 A | 11/1992 | Berkeley et al. | |
| 5,270,952 A * | 12/1993 | Adams | G05D 23/1904 165/239 |
| 5,284,024 A | 2/1994 | Hanson et al. | |
| 5,345,226 A | 9/1994 | Rice, Jr. et al. | |
| 5,395,042 A | 3/1995 | Riley et al. | |
| 5,422,824 A | 6/1995 | Biehler et al. | |
| 5,596,507 A | 1/1997 | Jones et al. | |
| 5,682,329 A | 10/1997 | Seem et al. | |
| 5,690,277 A | 11/1997 | Flood | |
| 5,790,754 A | 8/1998 | Mozer | |
| 5,794,205 A | 8/1998 | Walters et al. | |
| 6,083,270 A | 7/2000 | Scott | |
| 6,385,510 B1 | 5/2002 | Hoog | |
| 6,413,079 B1 | 7/2002 | Lyons et al. | |
| 6,526,335 B1 | 2/2003 | Treyz et al. | |
| 6,584,439 B1 | 6/2003 | Geilhufe et al. | |
| 6,608,560 B2 | 8/2003 | Abrams | |
| 6,813,221 B1 | 11/2004 | Barr | |
| 6,988,070 B2 | 1/2006 | Kawasaki et al. | |
| 7,108,194 B1 | 9/2006 | Hankins, II | |
| 7,139,716 B1 | 11/2006 | Gaziz | |
| 7,146,253 B2 | 12/2006 | Hoog et al. | |
| 7,162,253 B2 | 1/2007 | Vare et al. | |
| 7,184,960 B2 | 2/2007 | Deisher et al. | |
| 7,280,643 B2 | 10/2007 | Howard et al. | |
| 7,317,970 B2 | 1/2008 | Pienta | |
| 7,349,682 B1 | 3/2008 | Bennett, II | |
| 7,349,758 B2 | 3/2008 | Miro et al. | |
| 7,397,363 B2 | 7/2008 | Joao | |
| 7,436,292 B2 | 10/2008 | Rourke et al. | |
| 7,436,296 B2 | 10/2008 | Rourke et al. | |
| 7,451,937 B2 * | 11/2008 | Flood | F23N 5/20 236/51 |
| 7,454,269 B1 | 11/2008 | Dushane et al. | |
| 7,464,035 B2 | 12/2008 | Funk et al. | |
| 7,522,063 B2 | 4/2009 | Ehlers | |
| 7,590,541 B2 | 9/2009 | Virji et al. | |
| 7,720,683 B1 | 5/2010 | Vermeulen et al. | |
| 7,747,446 B2 | 6/2010 | Blass et al. | |
| 7,752,047 B2 | 7/2010 | Morris | |
| 7,787,749 B2 | 8/2010 | Caspi | |
| 7,890,334 B2 | 2/2011 | Park et al. | |
| 7,899,912 B2 | 3/2011 | Bisdikian et al. | |
| 7,957,974 B2 | 6/2011 | Cho et al. | |
| 8,013,730 B2 | 9/2011 | Oh et al. | |
| 8,019,567 B2 | 9/2011 | Steinberg et al. | |
| 8,042,048 B2 | 10/2011 | Wilson et al. | |
| 8,068,881 B2 | 11/2011 | Schrager | |
| 8,078,472 B2 | 12/2011 | Resch et al. | |
| 8,099,289 B2 | 1/2012 | Mozer et al. | |
| 8,107,989 B2 | 1/2012 | Budampati et al. | |
| 8,155,767 B2 | 4/2012 | ElMankabady et al. | |
| 8,175,884 B1 | 5/2012 | Morris | |
| 8,234,119 B2 | 7/2012 | Dhawan et al. | |
| 8,239,922 B2 | 8/2012 | Sullivan et al. | |
| 8,411,590 B2 | 4/2013 | Wang | |
| 8,422,889 B2 | 4/2013 | Jonsson | |
| 8,509,954 B2 | 8/2013 | Imes et al. | |
| 8,630,742 B1 | 1/2014 | Stefanski et al. | |
| 8,874,266 B1 * | 10/2014 | Francis, Jr. | G05B 23/0221 700/247 |
| 10,145,579 B2 * | 12/2018 | Stoner | H04L 12/2816 |
| 2002/0034956 A1 | 3/2002 | Mekuria | |
| 2002/0123896 A1 | 9/2002 | Diez | |
| 2002/0193989 A1 | 12/2002 | Geilhufe et al. | |
| 2003/0034898 A1 | 2/2003 | Shamoon et al. | |
| 2003/0036909 A1 | 2/2003 | Kato | |
| 2003/0088642 A1 | 5/2003 | Price et al. | |
| 2003/0177012 A1 | 9/2003 | Drennan | |
| 2003/0233432 A1 | 12/2003 | Davis et al. | |
| 2004/0006477 A1 | 1/2004 | Craner | |
| 2004/0019489 A1 | 1/2004 | Funk et al. | |
| 2005/0049726 A1 | 3/2005 | Adamson et al. | |
| 2005/0275505 A1 * | 12/2005 | Himmelstein | G10L 17/22 340/5.8 |
| 2006/0161270 A1 | 7/2006 | Luskin et al. | |
| 2006/0180676 A1 | 8/2006 | Park et al. | |
| 2007/0013532 A1 | 1/2007 | Ehlers | |
| 2007/0038436 A1 * | 2/2007 | Cristo | G06F 17/273 704/9 |
| 2007/0078658 A1 | 4/2007 | Virji et al. | |
| 2007/0135969 A1 | 6/2007 | Curl | |
| 2007/0192486 A1 | 8/2007 | Wilson et al. | |
| 2007/0204228 A1 | 8/2007 | Mincar | |
| 2007/0250189 A1 | 10/2007 | Rourke et al. | |
| 2007/0263600 A1 | 11/2007 | Sutardja et al. | |
| 2007/0286181 A1 | 12/2007 | Bushmitch et al. | |
| 2008/0037727 A1 | 2/2008 | Sivertsen | |
| 2008/0091432 A1 | 4/2008 | Dalton et al. | |
| 2008/0175261 A1 | 7/2008 | Wang | |
| 2008/0221714 A1 | 9/2008 | Shoettle | |
| 2008/0233983 A1 | 9/2008 | Park et al. | |
| 2009/0057424 A1 | 3/2009 | Sullivan et al. | |
| 2009/0059786 A1 | 3/2009 | Budampati et al. | |
| 2009/0064295 A1 | 3/2009 | Budampati et al. | |
| 2009/0086940 A1 | 4/2009 | Diethorn et al. | |
| 2009/0143918 A1 | 6/2009 | Amundson | |
| 2009/0204262 A1 | 8/2009 | Nishimura | |
| 2009/0204410 A1 | 8/2009 | Mozer et al. | |
| 2009/0323904 A1 | 12/2009 | Shapiro et al. | |
| 2010/0070234 A1 | 3/2010 | Steinberg et al. | |
| 2010/0223055 A1 | 9/2010 | McLean | |
| 2010/0332235 A1 | 12/2010 | David | |
| 2011/0046792 A1 | 2/2011 | Imes | |
| 2011/0140914 A1 | 6/2011 | Pelech et al. | |
| 2011/0210816 A1 | 9/2011 | Wang | |
| 2011/0257973 A1 | 10/2011 | Chutorash et al. | |
| 2011/0290893 A1 | 12/2011 | Steinberg | |
| 2011/0307403 A1 | 12/2011 | Rostampour | |
| 2012/0021684 A1 | 1/2012 | Schultz et al. | |
| 2012/0066286 A1 | 3/2012 | Heredia et al. | |
| 2012/0123561 A1 | 5/2012 | Park et al. | |
| 2012/0136666 A1 | 5/2012 | Corpier et al. | |
| 2012/0158161 A1 | 6/2012 | Cohn et al. | |
| 2013/0006400 A1 | 1/2013 | Caceres et al. | |
| 2013/0035799 A1 | 2/2013 | Song | |
| 2013/0117395 A1 | 5/2013 | Bushmitch et al. | |
| 2013/0138250 A1 * | 5/2013 | Mowery | G05D 23/1917 700/276 |
| 2013/0183944 A1 * | 7/2013 | Mozer | H04L 12/282 455/414.1 |
| 2013/0297078 A1 | 11/2013 | Kolavennu | |
| 2014/0163751 A1 | 6/2014 | Davis | |
| 2014/0330435 A1 | 11/2014 | Stoner et al. | |
| 2015/0002046 A1 | 1/2015 | Schlangen | |

(56) References Cited

U.S. PATENT DOCUMENTS

| | | | |
|---|---|---|---|
| 2015/0053779 | A1 | 2/2015 | Adamek et al. |
| 2015/0053781 | A1 | 2/2015 | Nelson et al. |
| 2015/0276254 | A1 | 10/2015 | Nemcek et al. |

FOREIGN PATENT DOCUMENTS

| | | |
|---|---|---|
| CN | 202092667 U | 12/2011 |
| CN | 102332204 A | 1/2012 |
| CN | 102436273 A | 5/2012 |
| EP | 1 054 387 A2 | 11/2000 |
| EP | 1 119 191 A2 | 7/2001 |
| EP | 1 260 886 A2 | 11/2002 |
| EP | 1 345 360 B1 | 7/2006 |
| EP | 1 135 757 B1 | 11/2006 |
| EP | 1 415 218 B1 | 2/2011 |
| EP | 2 801 972 A1 | 11/2014 |
| GB | 2 094 508 A | 9/1982 |
| JP | 2006-208460 A | 8/2006 |
| JP | 3803045 B2 | 8/2006 |
| JP | 2006-317573 A | 11/2006 |
| JP | WO2009/107211 A1 | 9/2009 |
| JP | 4503310 B2 | 7/2010 |
| JP | 2010-181064 A | 8/2010 |
| JP | 4533844 B2 | 9/2010 |
| JP | 2010-236759 A | 10/2010 |
| JP | 4640178 B2 | 3/2011 |
| JP | 4839605 B2 | 12/2011 |
| KR | 10-2010-0026353 | 3/2010 |
| KR | 10-2011-0012048 | 2/2011 |
| KR | 10-2011-0045314 | 5/2011 |
| KR | 10-2012-0017492 | 2/2012 |
| KR | 10-1151571 | 5/2014 |
| WO | WO 93/13507 | 7/1993 |
| WO | WO 99/34339 | 7/1999 |
| WO | WO 2006/126192 A2 | 11/2006 |
| WO | WO 2007/101164 A2 | 9/2007 |
| WO | WO 2008/018102 A2 | 2/2008 |
| WO | WO 2009/147927 A1 | 12/2009 |

OTHER PUBLICATIONS

English language translation of bibliographic data and abstract of CN101947788 (A).
English language translation of bibliographic data and abstract of CN202092667 (U).
English language translation of bibliographic data and abstract of CN102332204 (A).
English language translation of bibliographic data and abstract of CN102436273 (A).
English language translation of bibliographic data and abstract of JP3803045 (B2).
English language translation of bibliographic data and abstract of JP2006208460 (A).
English language translation of bibliographic data and abstract of JP2006317573 (A).
English language translation of bibliographic data of JP4503310 and English language translation of abstract of JP2005234332 (A).
English language translation of bibliographic data and abstract of JP2010181064 (A).
English language translation of bibliographic data of JP4533844 (B2) and English language translation of abstract of EP1699041 (A1).
English language translation of bibliographic data and abstract of JP2010236759 (A).
English language translation of bibliographic data of JP4640178 (B2) and English language translation of abstract of EP1690706 (A1).
English language translation of bibliographic data of JP4839605 (B2) and English language translation of abstract of JP2006155208 (A).
English language translation of bibliographic data and abstract of KR20100026353 (A).
English language translation of bibliographic data and abstract of KR20110012048 (A).
English language translation of bibliographic data and abstract of KR20110045314 (A).
English language translation of bibliographic data and abstract of KR20120017492 (A).
English language translation of bibliographic data of KR101151571 (B1) and English language translation of abstract of KR20120009787 (A).
English language translation of bibliographic data of JPWO2009107211 (A1) and English language translation of abstract of WO2009107211 (A1).
$T^2$ RERC Rehabilitation Engineering Research Center on Technology Transfer, Accessible Thermostat, 40 pages, downloaded Jun. 6, 2013.
Brown, et al., "Joint DoD/Industry Study on Opportunities in Integrated Diagnostics," Institute for Defense Analysis, 110 pages, Jan. 1990.
Carrier Comfort Network, "Carrier Comfort System ($VVT_{111}$)," 6 pages, Aug. 1996.
Carvalho et al., "Voice Thermostat Remote Control," Proceedings of the IEEE 25th Annual Northeast Bioengineering Conference, pp. 59-60, Apr. 8-9, 1999.
Coleman (a Johnson Controls Company), "Hints for Homeowner's, A Thermostat That Speaks to Comsumer's Needs" 1 page, on or before Jul. 20, 2006.
International Search Report for PCT International Application No. PCT/US2013/039326, dated Aug. 6, 2013.
Honeywell, "PM7006A Network Compatible Computer Room Air Conditioning (CRAC) Program Module for W7600 Control Module," 72 pages, Aug. 1993.
"Kelvin Voice Operated Thermostat," 2 pages, printed Dec. 9, 2013, http://www.accendaproducts.com/kelvin/index.html.
"Control Your Home by Voice or the Web, Anytime Anywhere," 1 page, printed Dec. 9, 2013, http://www.automatedliving.com.
VoiceIR Environmental Voice Controller Configurator—Broadened Horizons, 17 pages, Dec. 9, 2013 http://www.broadenedhorizons.com/voiceir/.
"Voice Recognition & Voice Interactive Products," 1 page, printed Dec. 9, 2013, http://www.innotechsystems.com/voice.htm.
"Telephone Controlled Thermostat," 4 pages, printed Dec. 9, 2013, http://www.rciautomation.com/thermostat_phone.htm.
"Talking Thermostats for Persons who are blind," 3 pages, printed Dec. 12, 2013, http://www.talkingthermostats.com/blind.shtml.
"Siri Proxy-NestLearning Thermostat," 3 pages, printed Jan. 6, 2014, https://github.com/chilitechno/SiriProxy-NestLearningthermostat.
"SiriProxy," 7 pages, printed Dec. 9, 2013, https://github.com/plasmoni/SiriProxy.
Jacobson, "Design: A Voice Activated Thermostat," Biomedical Sciences Instrumentation, Technical Papers Composing the Proceedings of the 29th Annual Rocky Mountain Bioengineering Symposium, vol. 28, pp. 15-19, 1992.
Lacquet et al., "Short Communications, an Affordable Digital-Display-to-Natural-Voice Converter for Visually Impaired Radio Amateurs," IEEE Transactions on Rehabilitation Engineering, vol. 4, No. No. 4, 6 pages, Dec. 1996.
Lee et al., "Fault Detection in an Air-Handling Unit Using Residual and Recursive Parameter Identification Methods," Ashrae Transactions vol. 102, Pt. 1, pp. 1-12, 1996.
Lopez et al., "Temperature and Humidity Laboratory Remote Controller," Journal of the Mexican Society of Instrumentation, pp. 14-20, 1996.
Miles et al., "An Audible Thermostat for the Blind or Visually Challenged," Proceedings of the IEEE 23.sup.rd Northeast Bioengineering Conference, pp. 68-69, May 21-22, 1997.
Piette et al., "Model-Based Chiller Energy Tracking for Performance Assurance at a University Building," Cool Sense National Forum on Integrated Chiller Retrofits, San Francisco, Calif, LBNL Report-40781, Sep. 1997.

(56) References Cited

OTHER PUBLICATIONS

Talkingthermostats.com, "Comfort Solutions for Persons Who are Blind or have Low Vision, VIP 3000 Residential Talking Thermostat that Promotes Independent Living," 2 pages, on or before Aug. 19, 2011.
Venstar, "Comfort Call System ACCO433 Owner's Manual," 24 pages, Aug. 2007.
Walters, "Siri Hack Allows Voice Control of Home Thermostat," found at ttp://www.extremetech.com/computing/106073-siri-hack-allows-voice-control-of-home . . . , 2 pages, Nov. 21, 2011.
Thesis by James Bonner Watt, "Development of Empirical Temperature and Humidity-Based Degraded-Condition Indicators for Low-Tonnage Air-Conditioners,"ESL-TH-97/12-03, 205 pages, Dec. 1997.
Watt, "Predictive Maintenance Programs (PMP's) in Small HVAC Applications: Analysis of Available Products and Technology," ESL Report from Paper Prepared for MEEN 662, 4 pages, Apr. 1994.
Action Talking Products LLC, "Kelvin Installation Manual," V1.5, pp. 1-15, downloaded Jul. 14, 2015.
"A Thermostat That Speaks to a Consumer's Needs," 3 pages, printed Jul. 14, 2015, https://storify.com/plumbingtips969/a-thermostat-that-speaks-to-a-consumer-s-needs.
SmartWay Solutions, Inc., "Talking Thermostat Model VT3000, User's Guide," pp. 1-20, downloaded Jul. 14, 2015.
Systems Controls & Instruments, LLC, "CEM-24 Series Owner's Manual—Installation and Operating Instructions," 32 pages, downloaded Jul. 14, 2015.
The International Preliminary Report on Patentability and Written Opinion for PCT Application PCT/US2014/040629 dated Dec. 8, 2015.
The Extended European Search Report for EP Application No. 14806841.4, dated Jan. 24, 2017.
Lennox, "icomfort Wi-Fi Thermostat, Touch Screen Programmable Communicating Thermostat," Homeowner's Manual, 21 pages, Sep. 2012.
Stargate Interactive Automation System: JDS Technologies, 9 pages, printed May 9, 2013, web.archive.org/web20030215020919/http:www.jdstechnologies.com/stargate.ht ml.
International Search Report for PCT/US2014/040629, dated Sep. 30, 2014.
Office Action and Translation of the Office Action for Chinese Application No. 201380035240.9, dated Jun. 21, 2017.

* cited by examiner

DEVICES AND METHODS FOR INTERACTING WITH A CONTROL SYSTEM THAT IS CONNECTED TO A NETWORK

This is a continuation of co-pending U.S. patent application Ser. No. 13/911,638, entitled DEVICES AND METHODS FOR INTERACTING WITH A CONTROL SYSTEM THAT IS CONNECTED TO A NETWORK, filed on Jun. 6, 2013, which is a continuation-in-part of U.S. patent application Ser. No. 13/875,213 entitled DEVICES AND METHODS FOR INTERACTING WITH AN HVAC CONTROLLER, filed on the May 1, 2013, now U.S. Pat. No. 10,088,853, issued Oct. 2, 2018, and incorporated herein by reference in its entirety for all purposes.

TECHNICAL FIELD

The present disclosure relates generally to control systems, and more particularly, to control systems that accommodate and/or facilitate control of building automation and/or other devices.

BACKGROUND

Buildings, such as commercial and residential buildings, often include various control systems for controlling various devices. For example, buildings often include a Heating, Ventilation, and/or Air Conditioning (HVAC) system for monitoring and/or controlling various HVAC devices, a security system for monitoring and/or controlling various security system devices, appliance controllers for controlling various appliances, as well as other control systems and devices. What would be desirable is an improved system for interacting with such devices.

SUMMARY

The present disclosure relates generally to control systems, and more particularly, to control systems that accommodate and/or facilitate control of building automation and/or other devices. In one illustrative embodiment, a network connected building automation system may be controlled with a voice command manager, a first voice sensor device, and a second voice sensor device connected to a network. The voice command manager may translate natural language commands received over the network from the first voice sensor and/or the second voice sensor into one or more commands understandable by a building automation controller of the building automation system. Once the command is formulated, the voice command manager may send the formulated command to the building automation controller. In some cases, the building automation controller may be an HVAC controller, a security system controller, an appliance (refrigerator, washing machine, dryer, dish washer, television, etc.) controller, or any other suitable building automatic controller, as desired.

In some instances, a voice command manager of, or for, a building automation system may include an input port, an output port, a memory, and a processor. In some instances, the input port may be capable of receiving a natural language voice command over a network to which the voice command manager may be connected. The memory may store the received natural language command and the processor may be configured to translate the natural language voice command stored in the memory into one or more commands understandably by a building automation controller. The output port may be used to send the one or more commands to the building automation controller for execution.

In an illustrative method, a building automation system may function by receiving a natural language voice message at one or more of a first voice reception unit and a second voice reception unit. A natural language command based on the received natural language voice message may be communicated to a computing device, where the natural language command may be translated into a command understandable by one or more building automation controllers. Once the computing device has produced a command, the command may be sent to the one or more building automation controllers for execution.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
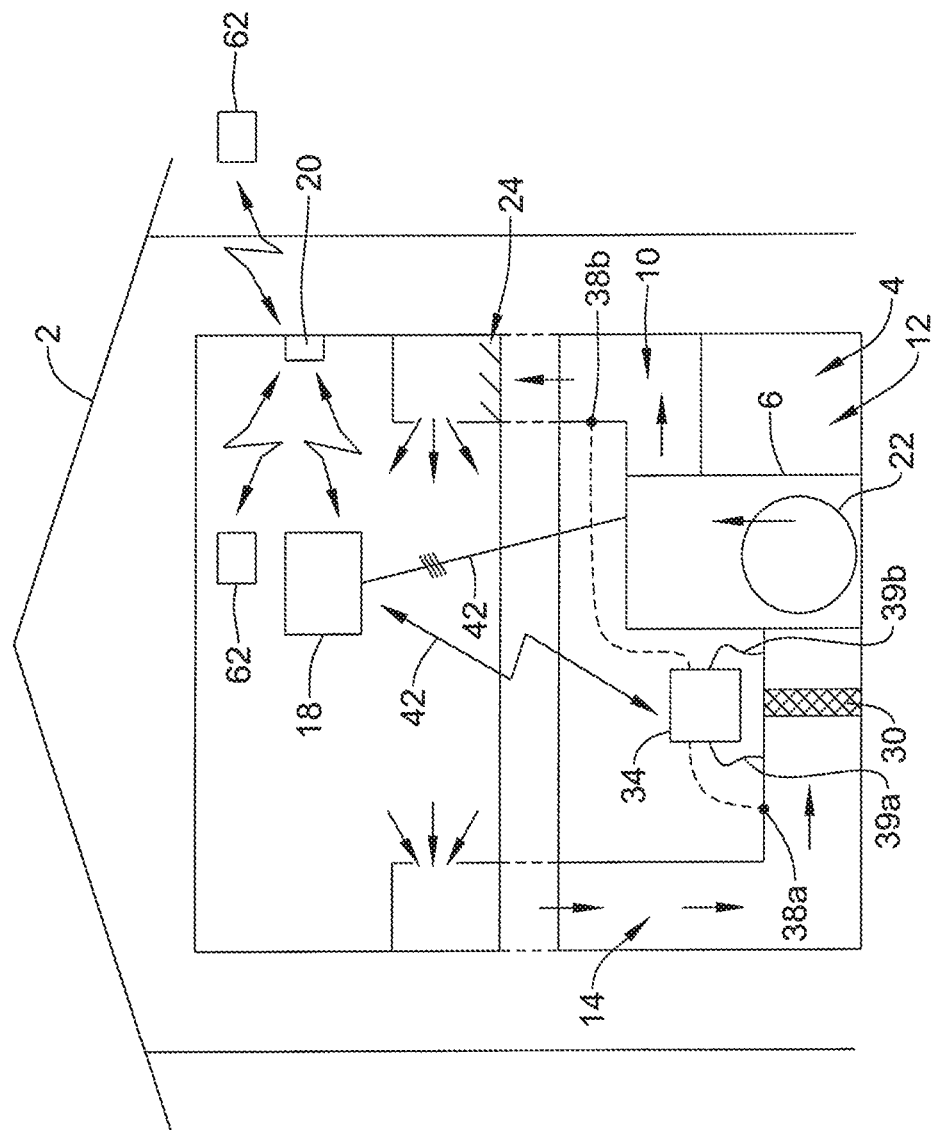
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 having an illustrative building automation system 4. While FIG. 1 shows a typical forced air type HVAC system as an illustrative building automation sub-system 12 of a building automation system 4, other building automation sub-systems 12 of a building automation system 4 are contemplated including, but not limited to, security systems, lighting control systems, water heater systems (e.g., boiler systems), refrigerators, clothes washers, clothes dryer, ovens, garage doors, radiant heating systems, electric heating systems, cooling systems, heat pump systems, any other suitable sub-system 12 of building automations systems 4, and/or portions thereof, as desired. The illustrative HVAC system of FIG. 1 includes one or more HVAC components 6, a system of ductwork and air vents including a supply air duct 10 and a return air duct 14, and one or more building automation controllers 18 (e.g., HVAC controllers). The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that a building automation controller(s) 18 may be configured to activate and deactivate the building automation sub-system(s) 12 (e.g., the HVAC system) or components of the building automation controller(s) or sub-system(s) (e.g., HVAC components 6) of the building automation system 4 in a controlled manner (e.g., to control the comfort level in the structure or building 2 and/or otherwise operate electronic features of the building 2). The building automation controller(s) 18 may be configured to control the building automation controller devices or building automation sub-systems 12 via a wired or wireless communication link 20. In some cases, the building automation controller(s) 18 may be a thermostat, such as, for example, a wall mountable thermostat or intelligent power switch (e.g., for controlling appliances not equipped with communications capabilities and other appliances), but this is not required in all instances. An example thermostat may include (e.g. within the thermostat housing) or have access to a temperature sensor for sensing an ambient temperature at or near the thermostat. In some instances, the building automation controller(s) 18 may be a zone controller, or may include multiple zone controllers each monitoring and/or controlling the comfort level within a particular zone in the building or other structure.

In the illustrative building automation system 4 shown in FIG. 1, the HVAC component(s) 6 (e.g., components of the building automation controller or building automation sub-system 12) may provide heated air (and/or cooled air) via the ductwork 10, 14 throughout the building 2. As illustrated, the HVAC component(s) 6 may be in fluid communication with every room and/or zone in the building 2 via the ductwork 10 and 14, but this is not required. In operation, when a heat call or command signal is provided by the building automation controller(s) 18, an HVAC component 6 (e.g. forced warm air furnace) may be activated to supply heated air to one or more rooms and/or zones within the building 2 via supply air ducts 10. The heated air may be forced through the supply air duct 10 by a blower or fan 22. In this example, the cooler air from each zone may be returned to the HVAC component 6 for heating via return air ducts 14. Similarly, when a cool call or command signal is provided by the building automation controller(s) 18, an HVAC component 6 (e.g. air conditioning unit) may be activated to supply cooled air to one or more rooms and/or zones within the building or other structure via supply air ducts 10. The cooled air may be forced through the supply air duct 10 by the blower or fan 22. In this example, the warmer air from each zone may be returned to the HVAC component 6 (e.g. air conditioning unit) for cooling via return air ducts 14. In some cases, the building automation system 4 may include an internet gateway 20 (e.g., a modem or other device providing a communication link) or other device that may allow one or more of the HVAC components 6, as described herein, to communicate over a wide area network (WAN) such as, for example, the Internet, and/or a device 20 that may allow one or more HVAC components 6 to communicate over any other network.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially opened position to modulate the flow of air from the one or more HVAC components 6 to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component 6.

In some cases, and as shown in FIG. 1, the illustrative building automation system 4 may include an equipment interface module (EIM) 34. When provided, the equipment interface module 34 may be configured to measure or detect a change in a given parameter between the return air side and the discharge air side of the building automation system 4. For example, the equipment interface module 34 may be adapted to measure a difference in temperature, flow rate, pressure, or a combination of any one of these parameters between the return air side and the discharge air side of the building automation controller or building automation sub-system 12. In some cases, the equipment interface module 34 may be adapted to measure the difference or change in temperature (delta T) between a return air side and a discharge air side of the HVAC system for the heating and/or cooling mode. The delta T for the heating mode may be calculated by subtracting the return air temperature from the discharge air temperature (e.g. delta T=discharge air temp.-return air temp.). For the cooling mode, the delta T may be calculated by subtracting the discharge air temperature from the return air temperature (e.g. delta T=return air temp.-discharge air temp.).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

Figure 3:
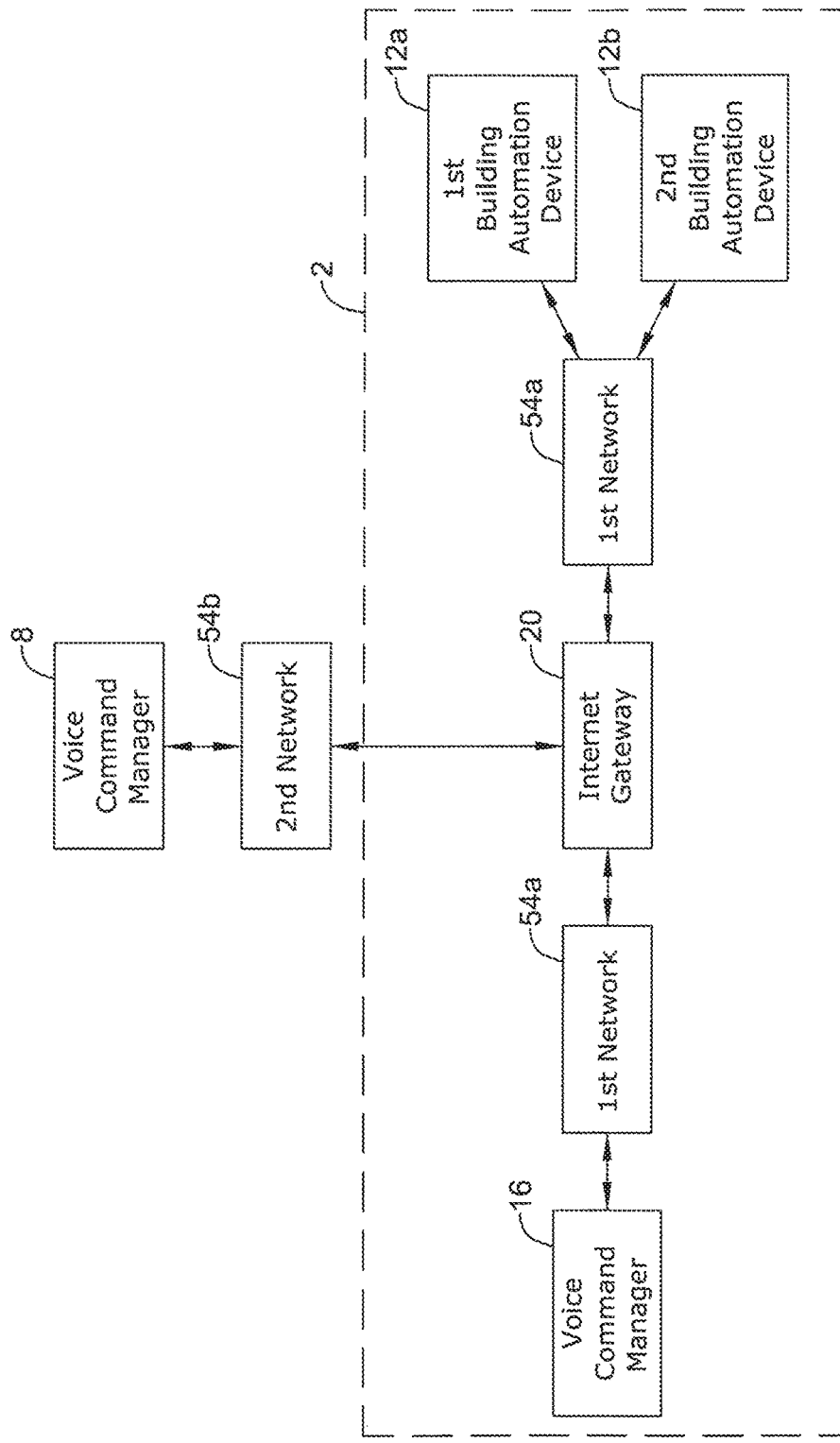
FIG. 3 is a schematic block diagram of an illustrative building automation system connected by a first network and a second network.

When provided, the equipment interface module 34 may be capable of and/or configured to communicate with the building automation controller(s) 18 via, for example, a wired or wireless communication link 42. In other cases, the equipment interface module 34 may be incorporated or combined with the building automation controller 18. In either case, the equipment interface module 34 may communicate, relay or otherwise transmit data regarding the selected parameter (e.g. temperature, pressure, flow rate, etc.) to the building automation controller 18. In some cases, the building automation controller 18 may use the data from the equipment interface module 34 to evaluate the system's operation and/or performance. For example, the building automation controller 18 may compare data related to the difference in temperature (delta T) between the return air side and the discharge air side of the building automation system 4 to a previously determined delta T limit stored in the building automation controller 18 to determine a current operating performance of the building automation system 4. Depending upon the application and/or where the building automation system user is located, remote access and/or control of the building automation controller 18 may be provided over a first network 54a (e.g. a local WiFi network) and/or a second network 54b (e.g. the Internet), as shown in FIG. 3. In some instances, the first network 54a and the second network 54b may collectively be considered network 54. An example of network connected building automation system is described in U.S. patent application Ser. No. 13/559,470, entitled METHOD OF ASSOCIATING AN HVAC CONTROLLER WITH AN EXTERNAL WEB SERVICE, filed Jul. 26, 2012, and hereby incorporated by reference in its entirety. Another example of a network connected building automation system is described in U.S. patent application Ser. No. 13/875,213, entitled DEVICES AND METHODS FOR INTERFACING WITH AN HVAC CONTROLLER, filed May 1, 2013, and hereby incorporated by reference in its entirety.

In some instances, a variety of remote devices 62 (see FIG. 4) may be used to access and/or control the building automation controller 18 from a remote location (e.g. remote from building automation controller 18 and interior or exterior the building 2) over a network 54 (e.g. the first network 54a and/or second network 54b). The remote devices 62 may include, but are not limited to, mobile phones including smart phones, personal digital assistants (PDAs), tablet computers, laptop or personal computers, wireless network-enabled key fobs, e-Readers and/or other computing devices, as desired. In some instances, the remote device 62 may include a voice sensor device or voice reception unit 16, as shown in FIG. 4.

In many cases, the remote devices 62 may be a remote wireless devices 62 that is configured to communicate wirelessly over the first network 54a and/or second network 54b with the building automation controller 18 via one or more wireless communication protocols such as cellular communication, ZigBee, REDLINK™, Bluetooth, WiFi, IrDA, dedicated short range communication (DSRC), EnOcean, and/or any other suitable common or proprietary wireless protocol, as desired.

Figure 4:
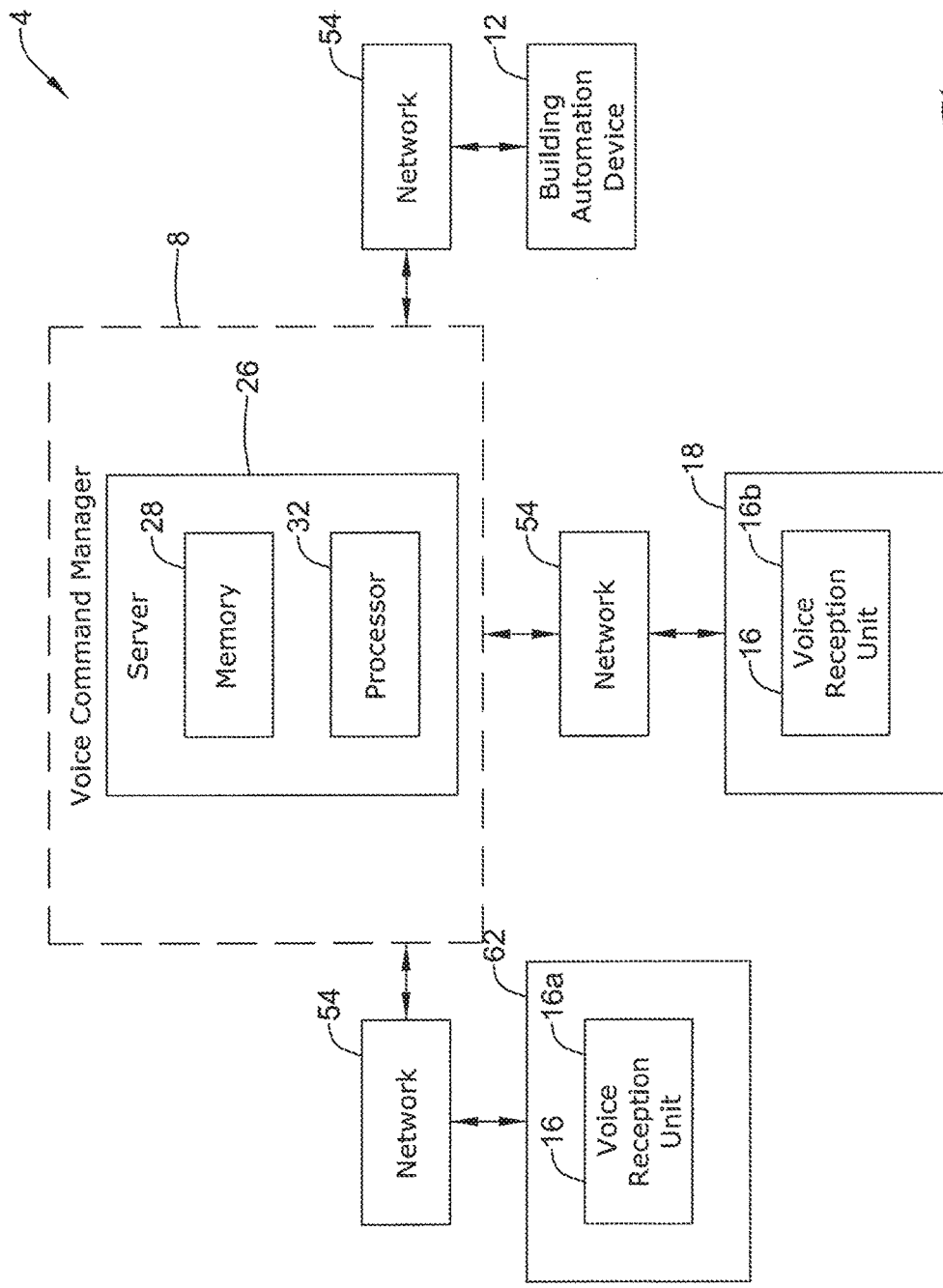
FIG. 4 is a schematic block diagram of an illustrative network connected building automation system with a plurality of illustrative voice reception units.

In some cases, and as shown in FIG. 4, a building automation system 4 serving a building 2 may include a network 54 (e.g., a local area network and/or wide area network), a voice command manager 8 connected to the network 54, one or more building automation controllers 18, one or more voice sensor devices or voice reception units 16 separate from and/or included in the building automation controller(s) 18, and/or one or more building automation or sub-system(s) 12. The voice command manager 8 may be implemented on and/or include a server 26 having a memory 28 and a processor 32 and/or other computing device having a memory and processor. In some instances, the server 26 may include one or more servers and/or computing devices.

The server 26 or other computing device on which the voice command manager 8 is implemented may be located at any location with respect to the building automation controllers or sub-systems 12 and/or the voice sensor devices or voice reception units 16, as desired. In some instances, the voice command manager 8 may be implemented on a server 26 located outside of the building 2, or a server 26 located inside of the building 2. Alternatively, or in addition, one or more portions of the voice command manager 8 may be stored on a server 26 located inside of the building 2 and one or more portions of the voice command manager 8 may be stored on a server located outside of the building 2.

The voice command manager 8 may take on any form of a server 26 and/or the voice command manager may include the server 26. Illustratively, the server 26 may be or may be included in a computing device or specialized voice recognition computer (e.g., a computer comprising hardware capable of storing voice recognition software and/or natural language command translation software), where the server 26 may include software capable of responding to requests across the network 54 to provide a service. Where the voice command manager 8 is on a single server 26 including computer or computing devices that communicate with the building automation controllers or sub-systems 12, users of the building automation system 4 may only need to have the voice command manager 8 recognize their individual voice commands, as opposed to training several voice command managers at each building automation controller or sub-system 12 (e.g., a voice command manager at each of a clothes washer, a clothes dryer, a refrigerator, a thermostat, a security system, a television, etc.) separately. Additionally, a single voice command manager 8 may allow for training the software of the voice command manager 8 (e.g., training the software to become accustomed to a building automation system user's commands) from a single location (e.g., from a comfortable chair) instead of at a building automation controller or sub-system 12 (e.g., a clothes washer, a clothes dryer, a refrigerator, a thermostat, a security system, a television, etc.) having an individual voice command manager 8.

Figure 2:
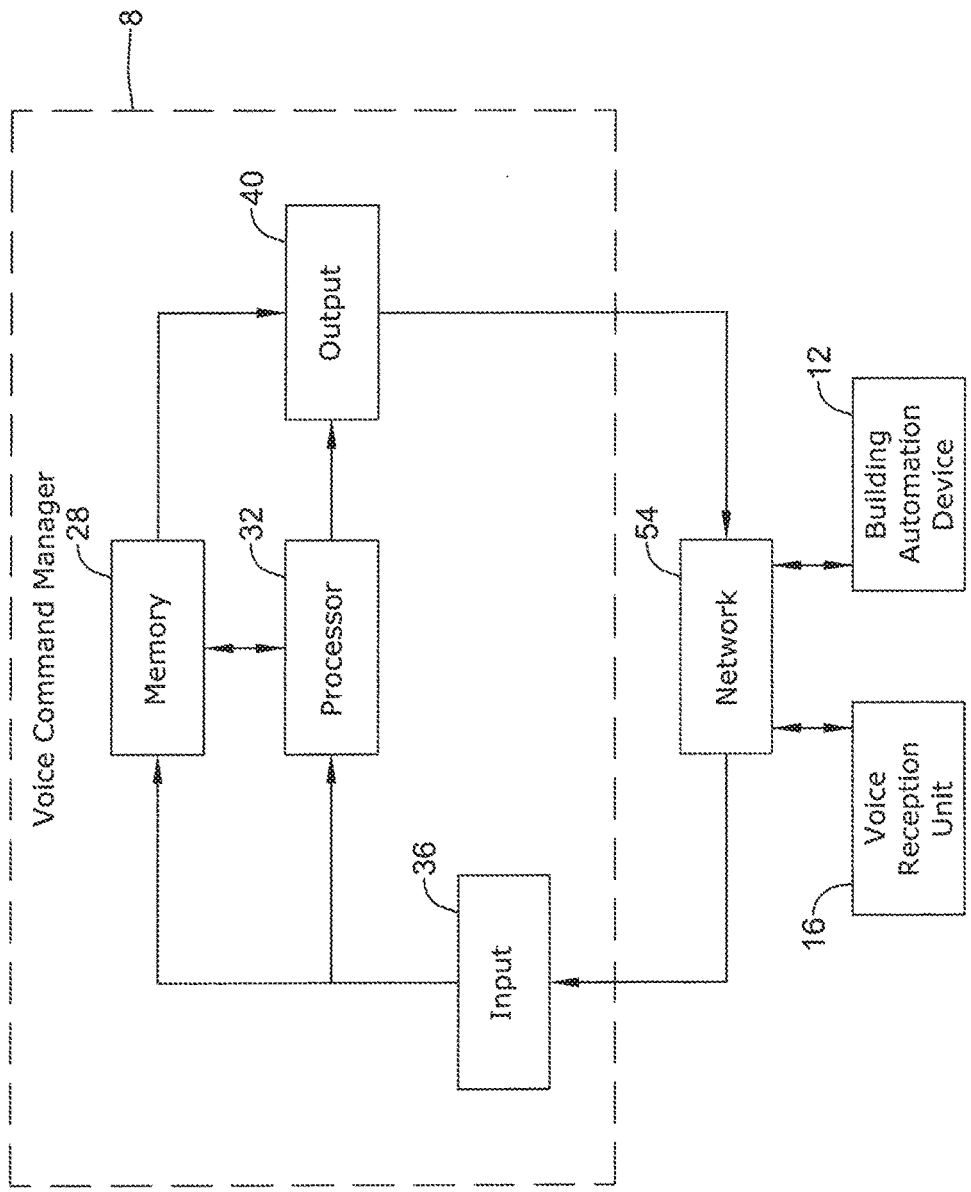
FIG. 2 is a schematic block diagram of an illustrative network connected building automation system.

In some instances, and as best shown in FIG. 2, the voice command manager 8 may include an input port 36, a memory 28, a processor 32, and an output port 40. The memory 28 may be any suitable type of storage device including, but not limited to, RAM, ROM, EPROM, flash memory, a hard drive, and/or the like. In some cases, the processor 32 may store information within the memory 28, and may subsequently retrieve the stored information from the memory 28.

Illustratively, the input port 36 may receive a natural language voice command or message (e.g., an audible verbal command or message) over a network 54 (e.g., a home network, WiFi network, a network connected to the world wide web or other wide area network, a cellular network, a telephone network, or any other wired or wireless communication network) from one or more voice sensor devices or voice reception units 16 or other devices capable of transmitting voice patterns to the voice command manager 8. In some instances, the natural language voice command or message may be communicated in a compressed or uncompressed audio file format. Formats may include, for example, WAV, AIFF, AU or raw header-less PCM, FLAC, Monkey's Audio (filename extension APE), WavPack (filename extension WV), TTA, ATRAC Advanced Lossless, Apple Lossless (filename extension m4a), MPEG-4 SLS, MPEG-4 ALS, MPEG-4 DST, Windows Media Audio Lossless (WMA Lossless), Shorten (SHN), MP3, Vorbis, Musepack, AAC, ATRAC and Windows Media Audio Lossy (WMA lossy), or any other suitable format, as desired.

The memory 28 may receive the natural language voice command(s) or message(s) either directly from the input port 36 or the memory 28 may receive the natural language voice command(s) or message(s) from the processor 32. The processor 32 may receive the natural language command(s) or message(s) from the input port 36 or the memory 28 and may translate the natural language command(s) or message(s) into one or more commands understandable by the building automation controller(s) or sub-system(s) 12 (e.g., machine language binary, hexadecimal code, etc.). The output port 40 may then send the one or more commands understandable by the building automation controllers or sub-system(s) 12 to the building automation controller or sub-system(s) 12 for execution.

In some instances, the input port 36 of the voice command manager 8 may be in communication via a network 54 (e.g., a wireless or wired network). The network 54 may be confined within the building 2 or may extend inside and/or outside of the building. While in communication with the network 54, the input port 36 may receive the natural language voice command(s) or message(s) from one or more voice sensor device(s) or voice reception unit(s) 16 that may be or has been in communication with the network 54. In some instances, the voice sensor device(s) or voice reception unit(s) 16 may be within the building 2 and may or may not be connected to the network 54. Alternatively, or in addition, the voice sensor device(s) or voice reception unit(s) 16 may be located remotely with respect to the building 2 and may communicate with the input port 36 and/or the output port 40 of the voice command manager 8 via any network connected to the world wide web (e.g., the internet) to provide a commanded to one or more building automation controllers or sub-systems 12 over the network 54.

In some illustrative examples, and as best shown in FIG. 4, the building automation system 4 may include a first voice sensor device or voice reception unit 16a (e.g., a voice sensor device of voice reception unit 16 of a remote device 62) and a second voice sensor device or voice reception unit 16b (e.g., a voice reception unit 16 of a building automation controller 18). The first and/or second voice sensor devices or voice reception units 16a, 16b may be in communication with a common voice command manager 8 over the network 54. In some instances, the first and/or second voice sensor devices or voice reception units 16a, 16b may receive and/or store natural language commands from a user and communicate the natural language commands to the voice command manager 8 over the network 54. Additionally, in some instances, the first and/or second voice sensor devices or voice reception units 16a, 16b may receive, display and/or play acknowledgements from the voice command manager 8 and/or the building automation controllers or sub-systems 12. For example, the voice command manager may indicate that another user is currently speaking to the system. In another example, when a first user provides a voice command to the first voice sensor device or voice reception unit 16a and a second user provides a voice command to the second voice sensor device or voice reception unit 16b that overlaps in time with the first user's command, the voice command manager 8 may acknowledge both voice commands and communicate via audible verbal communication (and/or a visual message on a screen) which command was accepted and why (e.g., "Terry just made a change to the system via a smart phone"). In yet another example, the voice command manager may acknowledge to the user that a command was received and that an action was taken, such as "the temperatures has been adjusted to seventy-two degrees".

Using the memory 28 and/or the processor 32, the voice command manager 8 may translate the natural language commands received from the first voice sensor device or first voice reception unit 16a and/or the second voice sensor device or voice reception unit 16b into one or more commands understandable by the building automation controller or sub-system 12. Once the natural language commands have been translated into one or more commands understandable by the building automation controller or sub-system 12, the voice command manager 8 may communicate or transmit the one or more commands to the building automation controller or sub-system 12 for execution.

In instances where the first and second voice sensor devices or voice reception units 16a, 16b communicate a received natural language command for the building automation controller or sub-system 12 to the voice command manager 8, the voice command manager 8 may translate both of the received natural language commands into corresponding commands understandable by the building automation controller or sub-system 12. If there is an identified conflict between the translated commands understandable by the building automation controller or sub-system 12, the voice command manager 8 may determine which of the corresponding translated commands, if any, have priority is/are communicated to the building automation controller or sub-system 12.

Alternatively, the voice command manager 8 may determine and/or identify if there is a conflict in the received natural language commands for the building automation controller or sub-system 12 prior to translating the natural language commands to commands understandable by the building automation controller or sub-system 12. Then, if there is an identified conflict between the received natural language commands, the voice command manager 8 may determine which of the natural language commands, if any, should be translated and communicated to the building automation controller or sub-system 12.

The voice command manager 8 or other feature (e.g., building automation controller or sub-system 12, etc.) may be capable of communicating with a user through one or more of the voice sensor device(s) or voice reception unit(s) 16. In one example, voice command manager 8 may communicate back to the first or second voice sensor devices or voice reception units 16a, 16b, or both, in response to receiving one or more natural language commands for a building automation controller(s) or sub-system(s) 12 from one or more of the first and second voice sensor devices or voice reception units 16*a*, 16*b*. In some instances, if two or more natural language commands for the building automation controller(s) or sub-system(s) 12 are received, the voice command manager 8 may communicate which command(s), if any, were translated and communicated to the building automation controller(s) or sub-systems 12. In one example, if a first user at first time earlier than a second time tells the thermostat to set back to a temperature at 2:00 PM and a second user (or the first user) at the second time tells a thermostat to set back at 3:00 PM for vacation, the voice command manager 8 may identify the conflict, report to the second user that there is a conflict in the thermostat scheduling, and ask the second user if the second user would like to override the command by the first user to set back the temperature at 2:00 PM. The communication (e.g., an acknowledgement) from the voice command manager 8 to the voice sensor device or voice reception unit(s) 16 may include a natural language acknowledgements, audible verbal message, a text-based message, a light indicator, an audible indicator, or any other communication, as desired.

In some instances, the voice sensor device or voice reception unit(s) 16 may perform other functions. For example, the voice sensor device or voice reception unit 16 may be capable of handling security and/or speaker identification instead of, or in addition to, programming each building automation controller or sub-system 12 separately to handle security and/or speaker identification, which may have various different security schemes to protect the devices or sub-systems 12 from unintended users operating them or from other undesirable occurrences.

It is contemplated that the voice sensor device(s) or voice reception unit(s) 16 may be any type of device. For example, the voice sensor device(s) or voice reception unit(s) 16 may be any device capable of receiving an audible verbal communication (e.g., a natural language command), storing (at least temporarily) the received audible verbal communication, and communicate the received audible verbal communication to a computing device (e.g., the voice command manager 8 or a computing device maintaining the voice command manager 8), receiving verbal or text-based communications from the computing device or other device of the building automation system 4, and/or displaying verbal or text-based communications from the computing device or other device of the building automation system 4 or displaying an indicator of the received communications from the computing device or other device of the building automation system 4. Illustratively, the voice sensor device(s) or voice reception unit(s) 16 may be or may be included in a telephone (e.g., a smart phone or other telephone), a thermostat, a security system panel, a sensor module, a tablet computer, a desktop computer, a lap top computer, a dedicated voice reception panel, any other type of control panel, and/or any other capable device, or any combination thereof. The voice sensor device(s) or voice reception unit(s) 16 may be permanently located within the building 2, may be permanently located remotely with respect to the building 2, and/or may be positionally adjustable with respect to being interior and/or exterior of the building 2.

Figure 5:
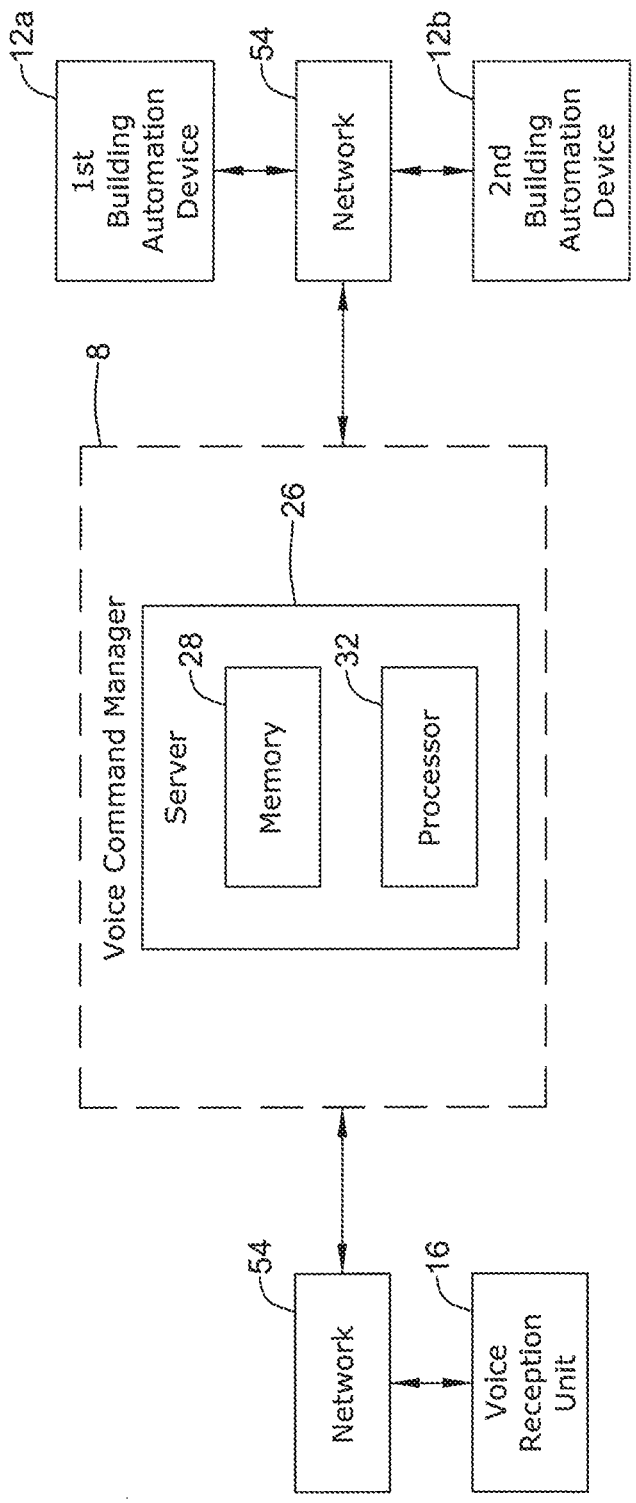
FIG. 5 is a schematic block diagram of an illustrative network connected building automation system with a plurality of illustrative building automation devices.
Figure 6:
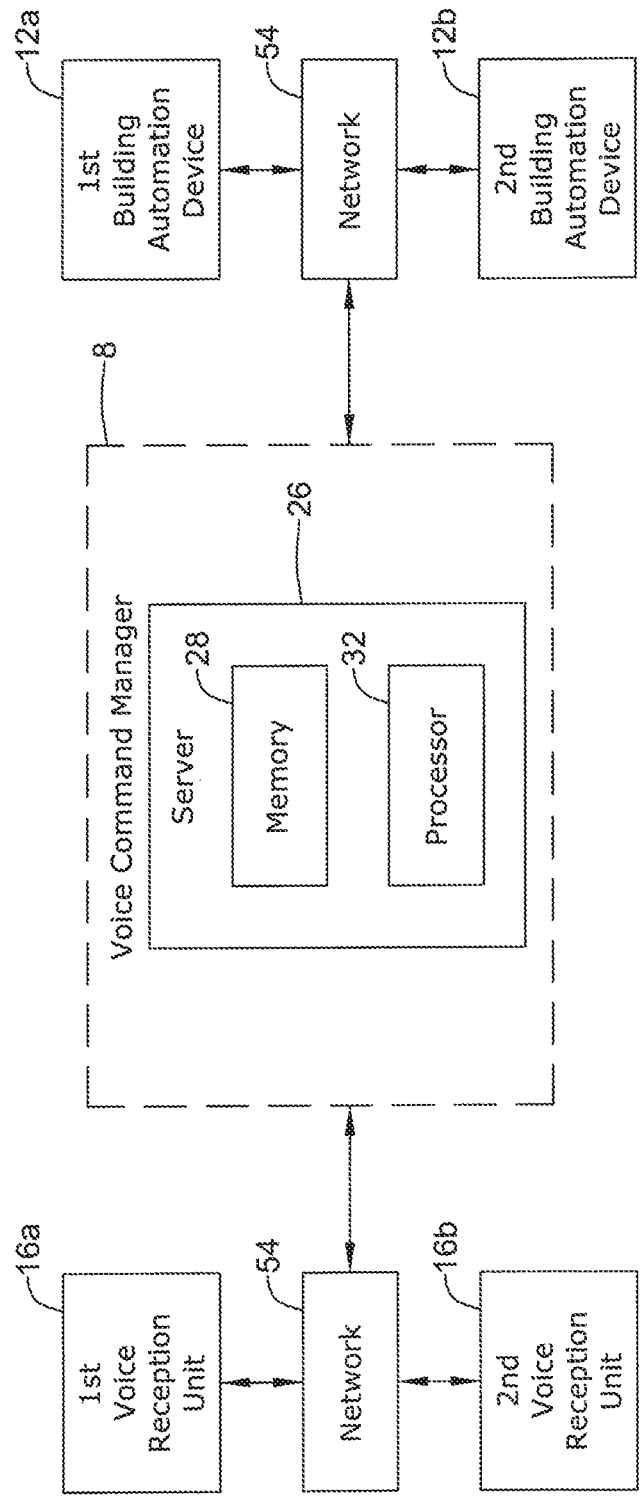
FIG. 6 is a schematic block diagram of an illustrative network connected building automation system with a plurality of illustrative building automation devices and a plurality of illustrative voice reception units.

In some instances, the building automation system 4 may include two or more building automation controllers or sub-systems 12 (e.g., two or more of HVAC systems, security systems, lighting control systems, water heater systems, refrigerators, clothes washers, clothes dryers, ovens, garage door opening systems, appliances, etc). In a building automation system 4 with a first building automation controller or sub-system 12*a* (e.g., a first appliance) and a second building automation controller or sub-system 12*b* (e.g., a second appliance), as shown in FIGS. 3, 5 and 6, a voice sensor device or voice reception unit 16 may receive a natural language message or phrase for one or more of the first and second building automation controllers or sub-systems 12*a*, 12*b*. The voice sensor device or voice reception unit 16 may then pass the natural language message or phrase (in either audible form or text form) to the voice command manager 8 including and/or implemented on a computing device (e.g., a server 26 with a processor 32 and memory 28) where the natural language message or phrase may be translated into a command understandable by one or more of the first and second building automation controllers or sub-systems 12*a*, 12*b* and is sent to the one or more of the first and second building automation controllers or sub-systems 12*a*, 12*b*.

Figure 7:
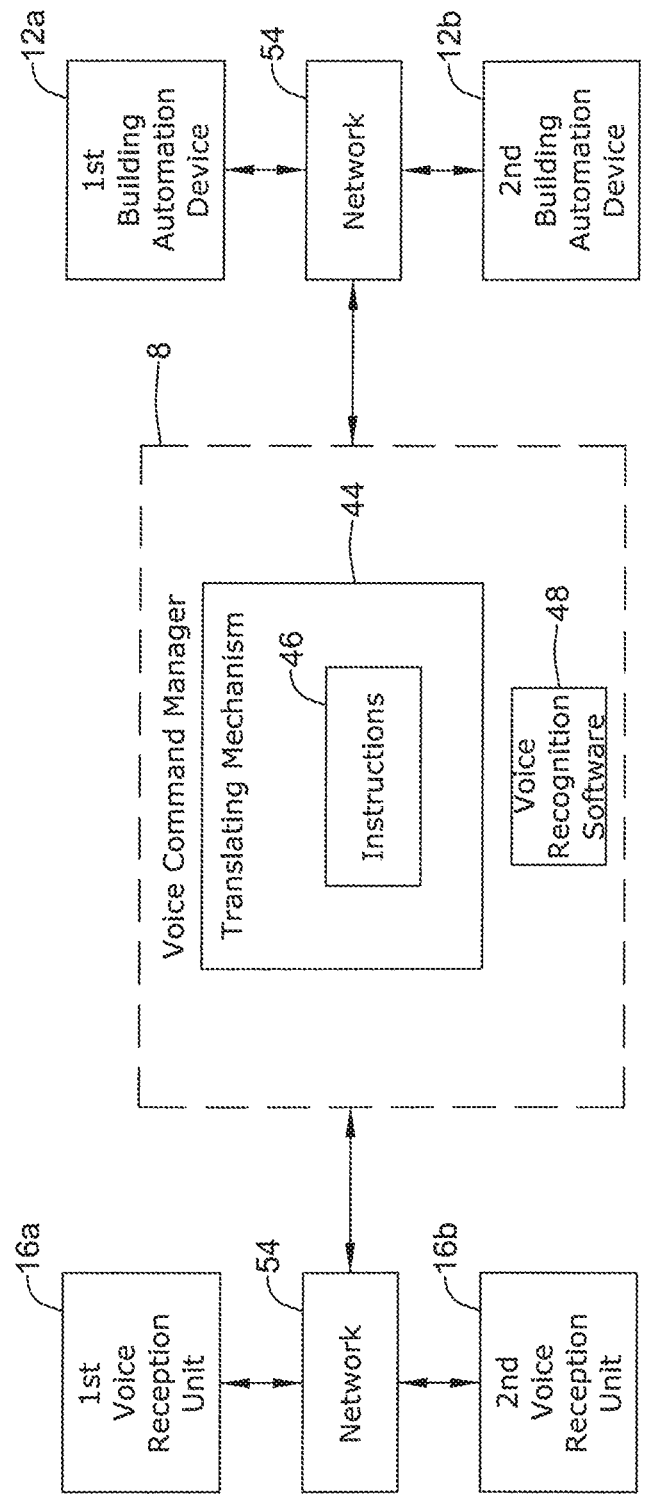
FIG. 7 is a schematic block diagram of an illustrative network connected building automation system with an illustrative translating mechanism and illustrative voice reception software located in illustrative voice reception units.
Figure 8:
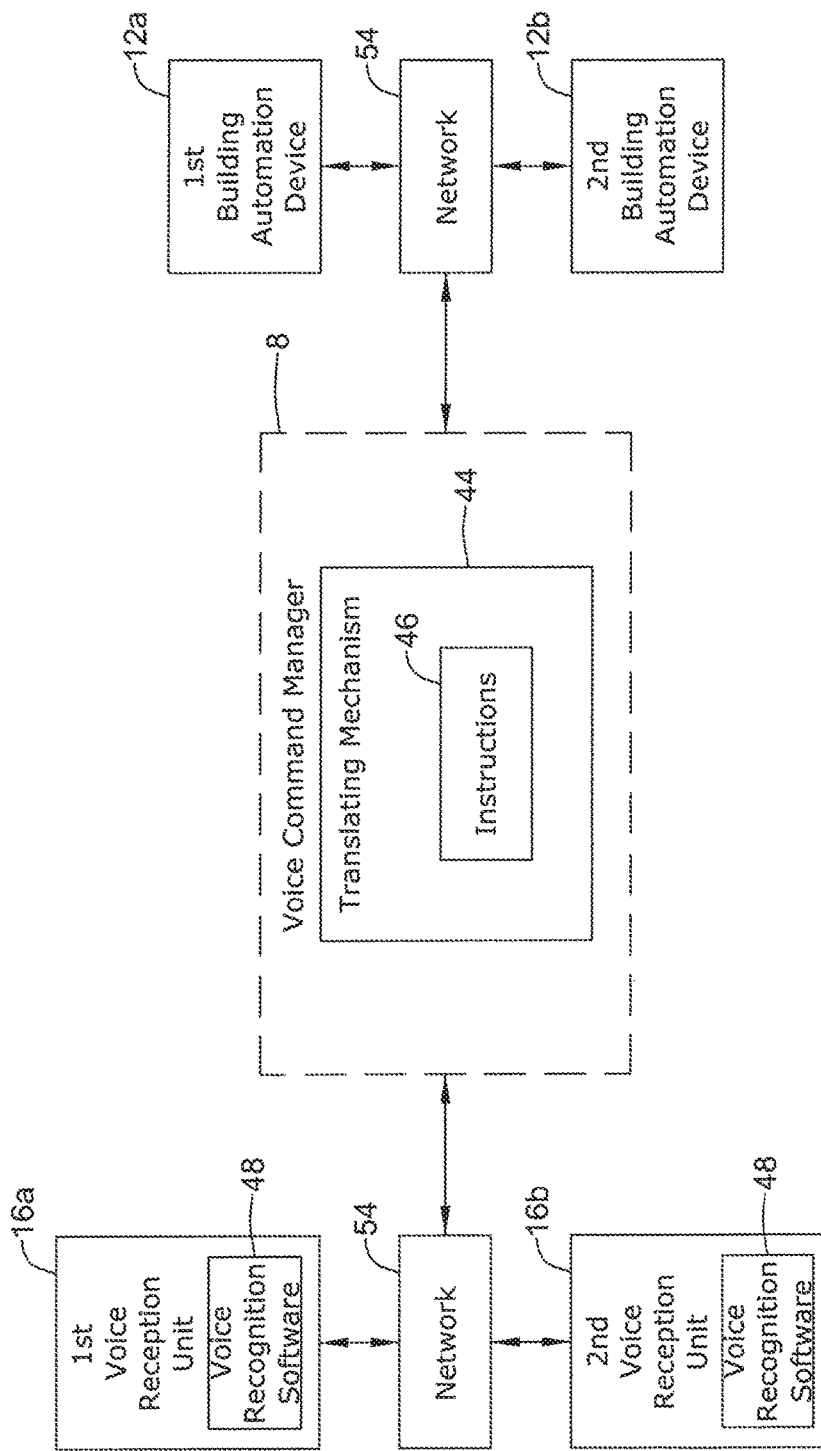
FIG. 8 is a schematic block diagram of an illustrative network connected building automation system with an illustrative voice command manager.

In some instances, a translating mechanism 44 of the voice command manager 8, as shown in FIGS. 7 and 8, may receive the natural language message or phrase and translate the natural language message or phrase into a command understandable by one or more of the first and second building automation controller or sub-systems 12*a*, 12*b*. Providing a central voice translating mechanism 44 (and voice command manager) may help the inputs and outputs of the building automation system 4 to be consistent regardless of the type (e.g., brand or version) of a building automation interface (e.g., the remote devices 62, the building automation controllers 18, and/or the building automation controllers or sub-systems 12). Additionally, the translating mechanism 44 or any other processing feature of the voice command manager 8 may help determine which of the first and/or second building automation controller or sub-system 12*a*, 12*b* the translated command is to be sent. Illustratively, the translating mechanism 44 may translate the natural language message or phrase to a command understandable by one or more of the first and second building automation controller or sub-system 12*a*, 12*b* before, during, or after making a determination to which, if any, of the first and second building automation controllers or sub-systems 12*a*, 12*b* to send the command.

The translating mechanism 44 may be configured to operate by executing instructions 46 (e.g., with the processor 32) stored on non-transitory computer readable media (e.g., memory 28). The instructions 46 stored on the non-transitory computer readable media may allow the translating mechanism 44 to translate a natural language text or voice based message or phrase into a command understandable by building automation controllers or sub-systems 12. Additionally, the stored instructions 46 may facilitate allowing the translating mechanism 44 to make decisions. For example, the stored instructions may allow the translating mechanism 44 to make decision as to which command(s) from incoming natural language messages or phrases to pass along to the building automation controllers or sub-systems 12, which command(s) to send to which building automation controllers or sub-systems 12, which acknowledgements of actions taken or commands sent to send to which of the voice sensor device(s) or voice reception unit(s) 16, and/or any other decisions, as desired.

In some cases, there may be a plurality of translating mechanisms 44 in one or more voice command managers 8. In other cases, there may be a single translating mechanism 44 in a single voice command manager 8. In instances, where there is a single translating mechanism 44 or other translating feature of the voice command manager 8, less computing power may be utilized than when there are multiple translating mechanisms 44 or translating features. A translating mechanism 44 may operate by learning and attempting to better its accuracy in forming building automation controller or sub-system 12 commands from various natural language messages, phrases, or commands. As a result, when there is a single translating mechanism 44, only a single translating mechanism of the voice command manager 8 may need to learn how to interpret natural language messages, phrases, or commands into commands understandable by the building automation controller(s) or sub-system(s) 12.

In some instances, voice recognition software 48 may be utilized to convert a natural language message, phrase, or command into a text-based natural language message, phrase, or command that may then be translated with the translating mechanism 44 into the appropriate command understandable by the building automation controller or sub-system 12. Illustratively, the voice recognition software 48 may include a library of voice commands that interface with the server 26 (e.g., the translating mechanism 44 of the voice command manager 8) to provide commands to the building automation controllers or sub-systems 12. The voice recognition software 48 may be any type of software used to recognize voice messages, phrases, and/or commands, and interpret them into text based voice messages, phrases, and/or commands. In one example, the voice recognition software 48 may be DRAGON NATURALLY SPEAKING™ voice recognition software. Additionally, or alternatively, other similar or different voice recognition software 48 may be utilized, such as the software executing the Siri voice recognition feature of the Apple™ Iphone™.

The voice recognition software 48 may be stored at the computing device (e.g., in memory 28) of the voice command manager 8, as shown in FIG. 7. Alternatively, or in addition, the voice recognition software 48 may be stored at the voice sensor devices or voice reception units 16, as shown in FIG. 8. Illustratively, the voice recognition software 48 may be stored at one or more locations of the building automation system 4 (e.g., at multiple voice sensor devices or voice reception units 16, at the voice command manager 8 and one or more voice sensor devices or voice reception units 16, or at any other desired location).

Figure 9:
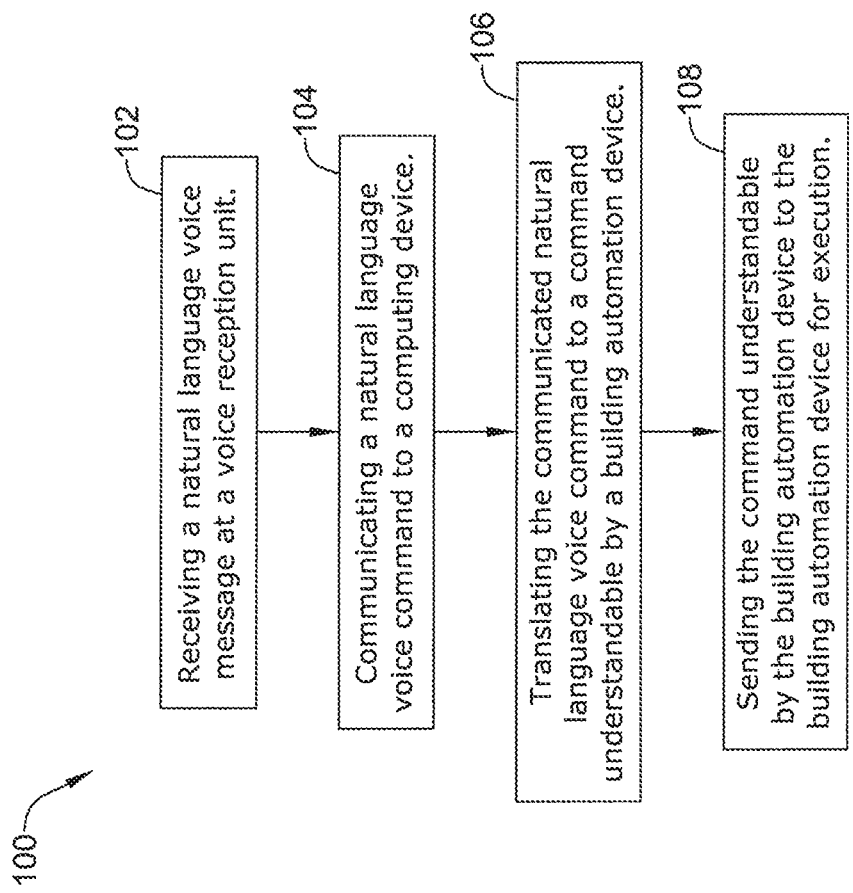
FIG. 9 is a schematic flow diagram of an illustrative method of operating a building automation system.

An illustrative, but non-limiting method of a building automation system 4 used to control and/or monitor building automation controllers or sub-systems in one or more buildings 2 is shown in FIG. 9. At block 102, the building automation system 4 may receive a natural language voice command or message at one or more voice sensor devices or voice reception units 16 (e.g., a first voice sensor device or voice reception unit 16a and a second voice sensor device or voice reception unit 16b). In some instances, the natural language command may be the natural language voice message. Alternatively, or in addition, the natural language command may be a text string derived from the natural language voice message via voice recognition software 48. At block 104, the building automation system 4 may communicate the natural language command or message to a computing device (e.g., the server 26 or other computing device). At block 106, the computing device (e.g., with the voice command manager 8 on the server 26) may translate the communicated natural language command or message to a command understandable by the one of the one or more building automation controllers or sub-systems 12. After the command has been translated, and at block 108, the building automation system 4 may send the command understandable by the one or more building automation controllers or sub-systems 12 to the one or more building automation controllers or sub-systems 12 for execution by the one or more building automation controllers or sub-systems 12. In some cases, the building automation system 4 may determine which sub-system(s) 12 the command pertains, and only send the command to the appropriate sub-system(s) 12.

In some instances, the building automation system 4 may receive a plurality of natural language voice messages from a plurality of voice sensor devices or voice reception units 16 in proximity in time. The plurality of natural language voice messages may include two or more commands for a single building automation controller or sub-system 12 or for a plurality of building automation controllers or sub-system 12. In instances where the plurality of natural language voice messages include two or more commands for a single building automation controller or sub-system 12, the computing device may select which, if any, of the two or more commands for the single building automation controller or sub-system 12 to send to the single building automation controller or sub-system 12 as a command understandable by the building the single building automation controller for execution thereby. The computing device may execute a number of rules that establish a priority scheme to help make this selection.

In some instances, the building automation system 4 may provide a communication to a user that an action was taken in response to a command to the building automation controllers or sub-systems 12. In one example, through one or more of the first voice sensor device or voice reception unit 16a and the second voice sensor device or voice reception unit 16b, a verbal communication of an action taken or not taken by the building automation controller(s) or sub-system(s) 12 may be provided in response to the command received by that building automation controller or sub-system 12. Where a plurality of command were received by one or more building automation controller(s) or sub-system(s) 12 in close proximity in time to one another, a plurality of acknowledgements may be made through the voice sensor device(s) or voice reception units 16 from which the natural language voice messages were received. Although method 100 may be described as being performed in a particular order, it is contemplated the method may be performed in one or more other orders, as desired.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A system of controlling a network connected building automation system servicing a building, the system comprising:
    a network;
    a server located outside of the building and connected to the network;
    a voice command manager implemented on the server;
    a thermostat located inside of the building, wherein the thermostat includes a temperature sensor and a first voice sensor device, wherein the thermostat is in communication with the voice command manager via the network, and wherein the thermostat is configured to receive a plurality of natural language voice commands via the first voice sensor device and to communicate each of the plurality of natural language voice commands received by the first voice sensor to the voice command manager via the network; and a second voice sensor device in communication with the voice command manager via the network, wherein the second voice sensor device is configured to receive the plurality of natural language voice commands and to communicate each of the plurality of natural language voice commands received by the second voice sensor device to the voice command manager via the network, and wherein the voice command manager is configured to translate each of the plurality of the natural language voice commands received into a respective command understandable by the thermostat, to transmit the respective command associated with each of the plurality of natural language voice commands received to the thermostat for execution, to identify a conflict between a first of the plurality of natural language voice commands received and a second of the plurality of natural language voice commands received, to transmit a query regarding whether the second of the plurality of natural language voice commands, that conflicts with the first of the plurality of natural language voice commands, should override the first of the plurality of natural language voice commands, to receive a response to the query, and to transmit the first of the plurality of natural language voice commands or the second of the plurality of natural language voice commands to the thermostat based on contents of the response.

2. The system of claim 1, wherein the voice command manager is configured to translate both the first of the plurality of natural language voice commands into the respective command and the second of the plurality of natural language voice command into the respective command to determine whether the conflict exists.

3. The system of claim 2, wherein the voice command manager is configured to communicate a notification to the thermostat, the second voice sensor device, or both the thermostat and the second voice sensor device identifying the respective command associated with the first of the plurality of natural language voice commands or the respective command associated with the second of the plurality of natural language voice commands that was communicated to the thermostat for execution.

4. The system of claim 3, wherein the notification is in a natural language format.

5. The system of claim 1, wherein the second voice sensor device is a phone.

6. A system comprising:

a voice command manager for a building automation system of a building, wherein the voice command manager includes:

an input port for receiving a plurality of natural language voice commands via a network;

a memory for storing each of the plurality of natural language voice commands received via the network;

a processor configured to translate each of the plurality of natural language voice commands received via the network into a respective translated command understandable by a building automation controller of the building automation system, to determine whether a conflict exists between a first of the plurality of natural language voice commands received and a second of the plurality of natural language voice commands received, to transmit a query regarding whether the second of the plurality of natural language voice commands, that conflicts with the first of the plurality of natural language voice commands, should override the first of the plurality of natural language voice commands, to receive a response to the query, and to use contents of the response to determine which of the first of the plurality of natural language voice commands and the second of the plurality of natural language voice commands to translate and provide to an output port to send to the building automation controller for execution; and the output port for sending the respective translated command associated with the first of the plurality of natural language voice commands or the respective translated command associated with the second of the plurality of natural language voice commands to the building automation controller for execution; and the building automation controller configured to execute the respective translated commands associated with the first of the plurality of natural language voice commands or the respective translated command associated with the second of the plurality of natural language voice commands received from the voice command manager.

7. The system of claim 6, wherein the voice command manager is implemented in a server outside of the building.

8. The system of claim 6, wherein the voice command manager is implemented in a computer inside of the building, wherein the input port is in communication with the network and receives at least one of the plurality of natural language voice commands via the network, and wherein the network is wireless.

9. The system of claim 8, wherein the input port receives the at least one of the plurality of natural language voice commands from a voice sensor device located within the building via the network.

10. The system of claim 6, wherein the input port receives at least one of the plurality of natural language voice commands from a voice sensor device located within the building.

11. The system of claim 10, wherein the voice sensor device is one or more of a thermostat, a security system panel, a sensor module, and a voice reception device.

12. The system of claim 6, wherein the input port receives at least one of the plurality of natural language voice commands from a voice sensor device located outside of the building.

13. The system of claim 12, wherein the voice sensor device is one or more of a smart phone, a tablet computer, a desktop computer, and a lap top computer.

14. The system of claim 6, wherein the building automation system includes at least two sub-systems, and wherein the processor is configured to determine to which of the at least two sub-systems to send the respective translated commands associated with the first of the plurality of natural language voice commands or the respective translated command associated with the second of the plurality of natural language voice commands and to send the respective translated command associated with the first of the plurality of natural language voice commands or the respective translated command associated with the second of the plurality of natural language voice commands to an appropriate one of the at least two sub-systems via the output port.

15. The system of claim 14, wherein the at least two sub-systems include one or more of an HVAC system, a security system, a lighting control system, a water heater system, a refrigerator, a clothes washer, a clothes dryer, and an oven.

16. A method of interfacing with a building automation controller of a building automation system, the method comprising:

receiving a first natural language voice message that includes a first natural language command for the building automation controller;

receiving a second natural language voice message that includes a second natural language command for the building automation controller;

communicating the first natural language voice message and the second natural language voice message to a server that is located remotely from and in operative communication with the building automation controller;

identifying a conflict between the first natural language command and the second natural language command;

transmitting a query regarding whether the second natural language command, that conflicts with the first natural language command, should override the first natural language command;

receiving a response to the query;

translating the first natural language voice message or the second natural language voice message into a translated building controller command understandable by the building automation controller based on contents of the response;

sending the translated building controller command to the building automation controller for execution; and executing the translated building controller command.

17. The method of claim 16, further comprising:

providing a verbal communication of an action taken by the building automation controller in response to the translated building controller command.

18. The method of claim 16, wherein the building automation controller includes a thermostat.

* * * * *